C. A. PIPER.
APPARATUS FOR MEASURING THE RELATIVE HARDNESS OF MATCH TIPS.
APPLICATION FILED APR. 20, 1917.

1,293,189.

Patented Feb. 4, 1919.

Inventor
Charles A. Piper
by his Attorney
John K. Nolan

C. A. PIPER.
APPARATUS FOR MEASURING THE RELATIVE HARDNESS OF MATCH TIPS.
APPLICATION FILED APR. 20, 1917.
1,293,189.
Patented Feb. 4, 1919.
2 SHEETS—SHEET 2.
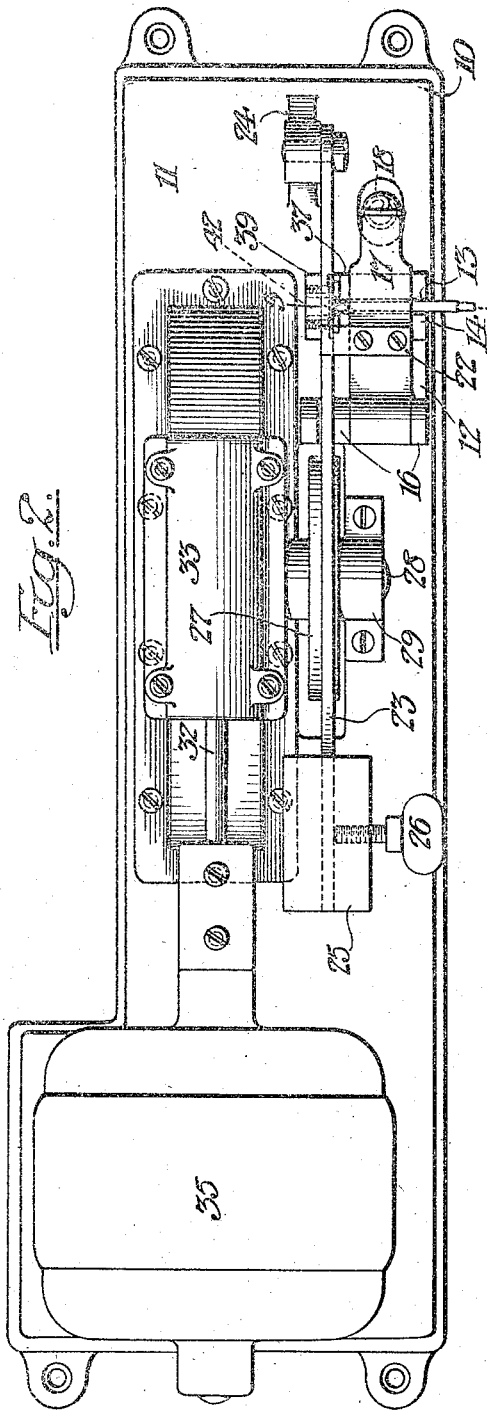
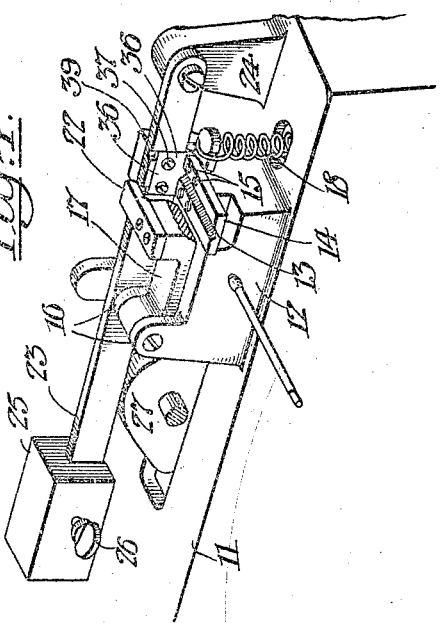
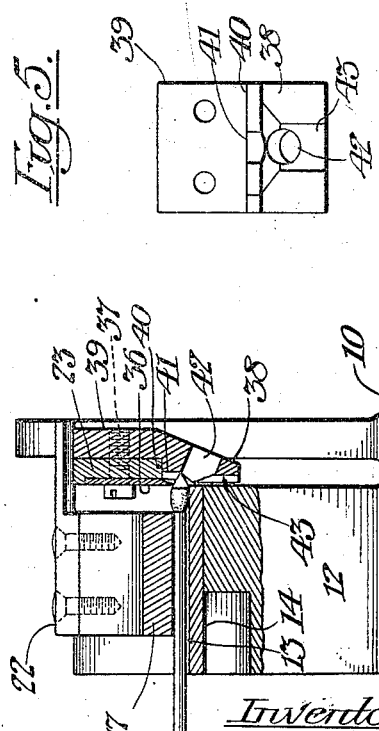

UNITED STATES PATENT OFFICE.

CHARLES A. PIPER, OF EAST WILMINGTON, CALIFORNIA, ASSIGNOR TO THE DIAMOND MATCH COMPANY, OF CHICAGO, ILLINOIS, A CORPORATION OF ILLINOIS.

APPARATUS FOR MEASURING THE RELATIVE HARDNESS OF MATCH-TIPS.

1,293,189.  Specification of Letters Patent.  Patented Feb. 4, 1919.

Application filed April 20, 1917. Serial No. 163,345.

*To all whom it may concern:*

Be it known that I, CHARLES A. PIPER, a citizen of the United States, and resident of East Wilmington, in the county of Los Angeles and State of California, have invented certain new and useful Improvements in Apparatus for Measuring the Relative Hardness of Match-Tips, of which the following is a specification.

The object of this invention is to provide an apparatus for measuring the relative hardness of match tips, particularly, though not exclusively, the tips of strike-any-where matches.

According to the principle of my invention the tips of a given quantity of specimen matches are individually subjected to the impact of a movable cutter the effective force of which bears a predetermined relation to the standard hardness of the tip composition, so that by calculating the percentage of matches whereof the tips are severed by the cutter and comparing the result with a prescribed scale of hardness values, the relative hardness of the composition can be determined.

In the preferred form of embodiment of my invention herein illustrated, a suitable support for a specimen match is provided; a tip cutter is borne by a vibratory lever in operative relation to the support so as to be movable upon and from the tip of the supported match, and appropriate cam mechanism is employed whereby such lever with the cutter is periodically raised and then permitted to descend; the lever being equipped with a gage for determining the position of the tip in relation to the cutter and with an adjustable load whereby the force of the cutter upon the tip can be nicely predetermined.

The invention also comprises various features of construction and combinations of parts, all of which will be hereinafter described and claimed.

In the drawings—

Fig. 2 is a plan of Fig. 1.

Fig. 3 is a transverse vertical section, enlarged, as on the line 3—3 of Fig. 2, showing the cutter as positioned upon the match tip.

Fig. 4 is a perspective view of the cutting mechanism and adjuncts, showing a specimen match about to be applied thereto.

Fig. 5 is a face view of a gage device for determining the position of the match tip in respect to the cutter.

Figure 1:
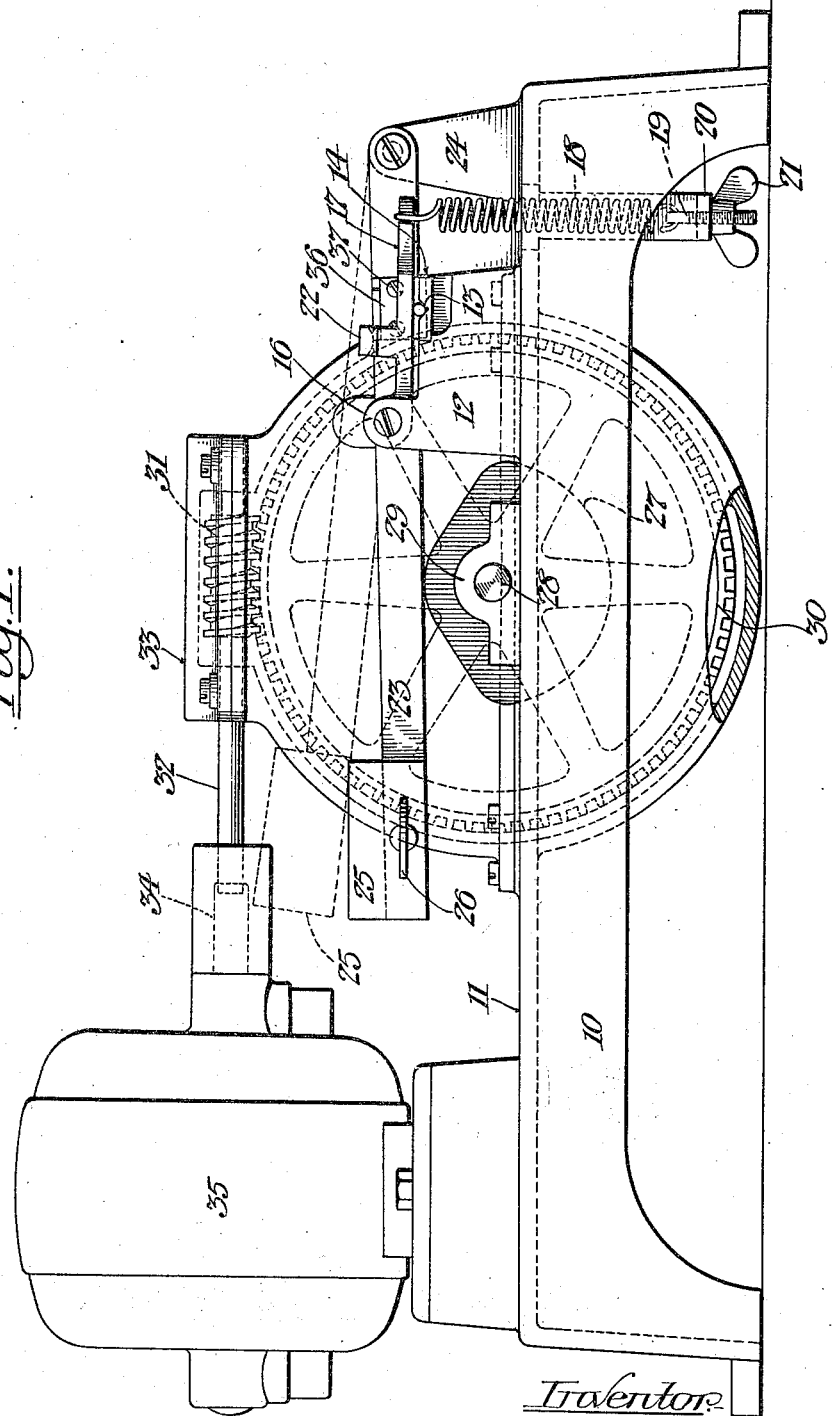
Figure 1 is a side elevation of a form of apparatus embodying the principle of my invention; the parts being illustrated in the relative positions which they occupy when the match tip is severed.

Referring to the drawings, 10 designates a supporting structure of suitable shape and size for its intended purpose. In the present instance the top of this structure comprises a horizontal bed 11 upon which is formed or secured, adjacent one side and end of the structure, an anvil 12 in and transversely of the upper surface of which is provided a groove of appropriate form to receive and support the stick of a specimen match. Preferably the groove is V-shaped in cross-section with a roughened or file-like gripping surface, such groove being conveniently formed, as at 13, in a separate plate 14, which is let into a recess in the anvil and is therein detachably held by screws 15. Pivoted in suitably-disposed upstanding lugs 16 on the anvil is a clamping arm 17 the free end of which overhangs the grooved plate. This arm is maintained in yielding contact with the positioned match in the groove 13 by the force of a spring 18 that is secured to the free end of the arm and to an adjustable screw 19 in a bracket 20 depending from the underside of the bed. The latter is appropriately perforated for the passage of the spring. By properly manipulating the thumb nut 21 on the screw the tension of the spring may be readily adjusted, in order that the arm shall exert more or less pressure on the match stick, as desired.

The clamping arm is provided with a lateral projection 22 (preferably constituted by a piece secured to an upstanding part of the arm) which overhangs an adjacent lever 23 extending longitudinally of the bed. One end of this lever is pivoted to a lug 24 on the bed, and the other end bears an adjustable load comprising, in the present instance, a slotted weight 25 which may be adjusted longitudinally of the arm, the weight being provided with a set-screw 26 whereby it can be secured in any desired position of adjustment. The lever overhangs and normally rests, by gravity, upon an appropriate cam 27 fast on a shaft 28 extending transversely of, and having its bearings in brackets 29, on the bed. The shaft 28 bears a worm wheel 30 with which meshes a worm 31 on a shaft 32 having its bearings in boxes on a gear case 33 supported on the bed; the latter shaft being secured to and constituting, in effect, a continuation of the shaft 34 of an electric motor 35 which is mounted on the bed. When the motor is energized, the motion is transmitted therefrom through the worm gearing to the cam shaft 28; the cam thus raising the overhanging weighted lever or permitting it to descend, as will presently appear.

On the side of the lever adjacent to the grooved plate 14, is a cutter comprising a blade 36 in the vertical path of which the match tip is positioned when the match is clamped. The lower or functional edge of the blade is not quite sharp but has a flat surface about .003″ in width. This blade is preferably let into a lateral recess in the lever and detachably held by screws 37, so that the cutter can be readily removed and replaced as need may require.

A suitably-disposed gage is provided to determine the position of the match tip in respect to the cutter and, therefore, the precise depth and amount of composition to be severed. In the present instance the gage is constituted by the depending portion 38 of a member 39 which is fastened to the outer side of the lever, preferably by the same screws that secure the cutter in place. The depending portion 38 of the gage member is provided with a shoulder 40 which takes under the lower edge of the lever and contacts with the side of the cutter, excepting at its median part adjacent the plane of the match-tip. Such part has formed therein a concave recess 41 which merges with the upper end of a downwardly and outwardly inclined orifice 42 in the depending portion 38 and also communicates with a vertical channel 43 in the inner side of the latter. The back wall of this channel is a predetermined distance in rear of the cutter so as to serve as a positive stop for the match tip when the match is applied to the grooved plate as above mentioned. At this stage the weighted lever is in raised position, through the action of the rotating cam thereon, as indicated by dotted lines in Fig. 1; but as the cam continues its movement it permits the gradual descent of the lever by gravity. In such descent of the lever the edge of the cutter impinges against the tip with a predetermined force, and in the event of the composition being below a certain degree of hardness the cutter slices a defined portion therefrom. In other words, the tip either supports the weight of the loaded cutter lever for a period of approximately two seconds or the cutter severs the tip composition. The severed material escapes through the inclined orifice 42. As the cam further rotates the lever is raised thereby and the yieldingly-held clamp arm is lifted from the match by the impingement of the lever on the lateral projection 22 of the arm. The operator then removes the match from the grooved plate 14, and disposes another match thereon for a repetition of the operation, and so on until a given quantity of specimen matches has been tested. By calculating the percentage of the matches whereof the tips are severed and comparing the result with a prescribed scale of hardness values the relative hardness of the composition tips is determined.

It is to be understood that I do not limit myself to the specific details of construction herein shown and described, as the same may be modified without departing from the principle of the invention as defined in the appended claims.

I claim—

1. An apparatus of the character described, comprising a movable cutter, a vertically-movable actuating element therefor, means for periodically actuating said element, and means for supporting a specimen match with its tip extending into the path of the cutter, said latter means including a clamp having operative connection with said actuating element whereby the clamp is moved to release the match when the element is raised.

2. An apparatus of the character described, comprising a movable cutter, a vertically-movable actuating element therefor, means for periodically actuating said element, and means for supporting a specimen match with its tip extending into the path of the cutter, said latter means including a clamp member, a spring normally holding said member in clamping position, means for adjusting the tension of said spring, and operative connection between said clamp member and the actuating element, whereby said member is moved to release the match when said element is raised.

3. An apparatus of the character described, comprising a cutter, a lever supporting the same, an adjustable load on said lever, means for periodically actuating said lever, and means for holding a specimen match with its tip extending into the path of the cutter.

4. An apparatus of the character described, comprising a cutter, a lever supporting the same, an adjustable load on the lever, a rotary cam for actuating the lever, means for operating the cam, and means for holding a specimen match with its tip extending into the path of the cutter.

5. An apparatus of the character described, comprising a cutter, a lever supporting the same, an adjustable load on said lever, means for periodically actuating said lever, means for supporting a specimen match with its tip extending into the path of the cutter, said latter means including a movable clamp having operative connection with the lever whereby the clamp is moved to release the match when the lever is raised.

6. An apparatus of the character described, comprising a cutter, a lever supporting the same, an adjustable load on said lever, a rotary cam upon which the lever normally rests, means for operating the cam, and means for supporting a specimen match with its tip extending into the path of the cutter, said latter means including a movable clamp having operative connection with the lever whereby the clamp is moved to release the match when the lever is raised.

7. An apparatus of the character described, comprising a cutter, a lever supporting the same, an adjustable load on said lever, means for periodically actuating said lever, a gage member on said lever adjacent the cutter, and means for supporting a specimen match with its tip against said gage.

8. An apparatus of the character described, comprising a cutter, a lever supporting the same, an adjustable load on said lever, a rotary cam upon which the lever normally rests, means for operating the cam, a gage member adjacent the path of the cutter, means for supporting a specimen match with its tip against said gage, said latter means including a movable clamp having operative connection with the lever whereby the clamp is moved to release the match when the lever is raised.

Signed at East Wilmington, in the county of Los Angeles and State of California, this 13th day of April A. D. 1917.

CHARLES A. PIPER.

Copies of this patent may be obtained for five cents each, by addressing the "Commissioner of Patents, Washington, D. C."